May 20, 1952 — W. H. RICKARD — 2,597,035
FISHING LURE
Filed April 17, 1948 — 2 SHEETS—SHEET 1
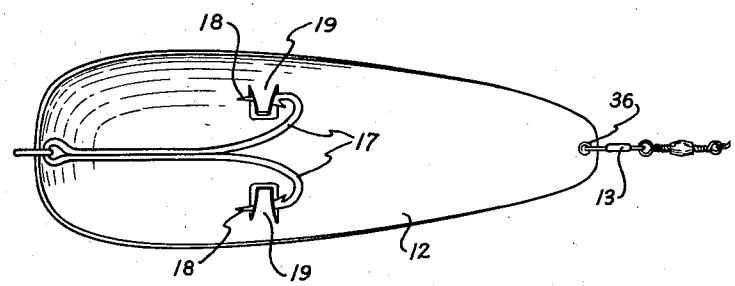
FIG.—1
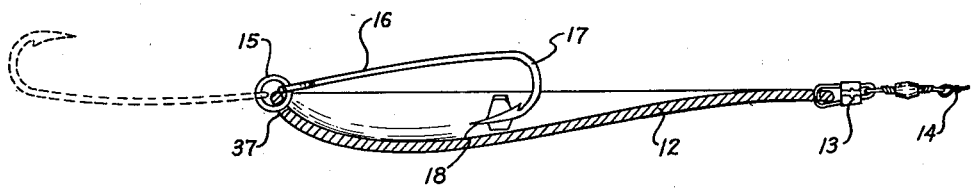
FIG.—2
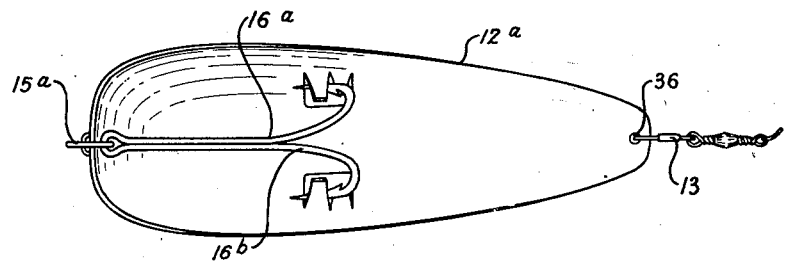
FIG.—3
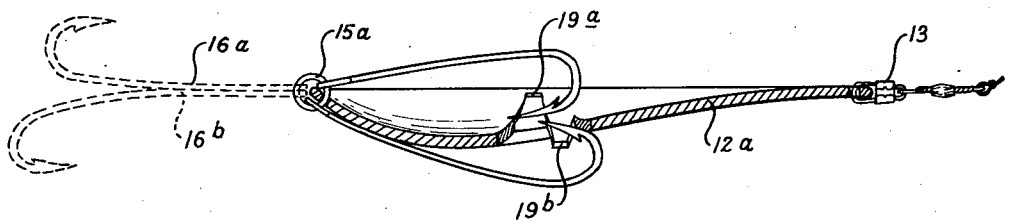
FIG.—4
INVENTOR.
William H. Rickard
BY
ATTORNEY May 20, 1952   W. H. RICKARD   2,597,035
FISHING LURE
Filed April 17, 1948   2 SHEETS—SHEET 2
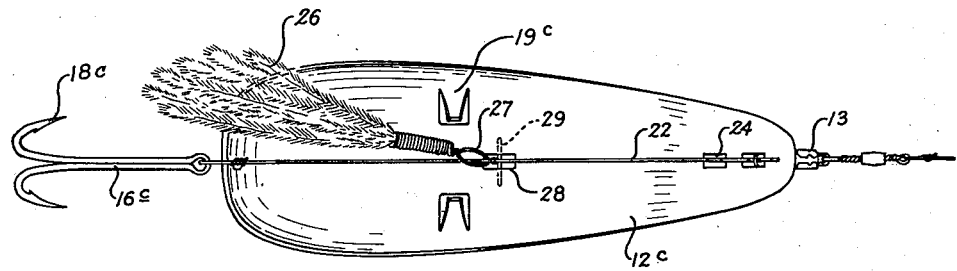
FIG.—5
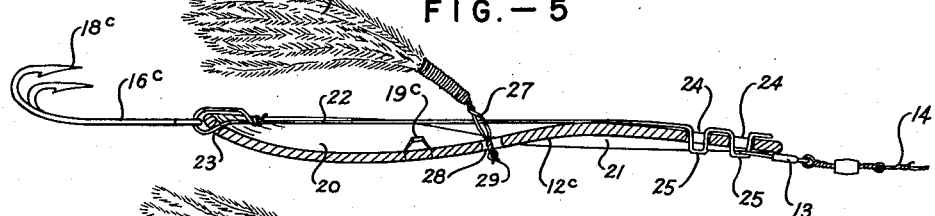
FIG.—6
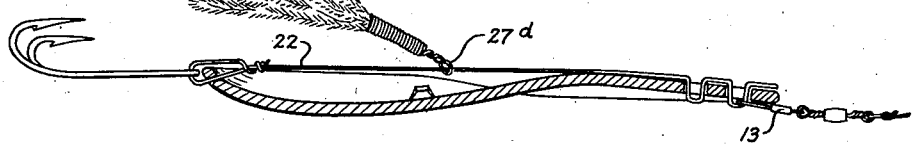
FIG.—7
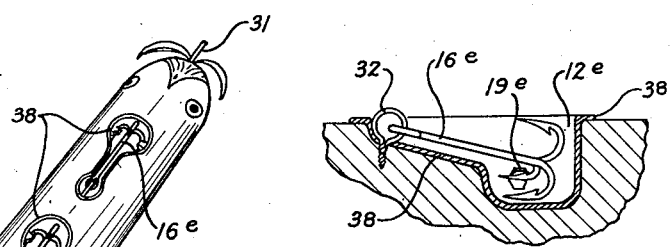
FIG.—8   FIG.—9
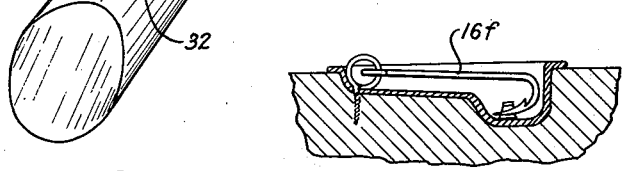
FIG.—10
INVENTOR.
William H. Rickard
BY
ATTORNEY Patented May 20, 1952

2,597,035

UNITED STATES PATENT OFFICE 2,597,035

FISHING LURE

William H. Rickard, Denver, Colo.

Application April 17, 1948, Serial No. 21,681

1 Claim. (Cl. 43—42.41)

My invention relates to fishing lures and has as an important object the provision of an integral hook guard adapted to hold gang hooks on the fishing lure when not in use in a position to prevent accidental engagement of the hooks with the fingers or clothing of the user, or with other hooks; prevents hooks from becoming dull when not in use; but which does not interfere with the action of the bait.

Another important object of my invention is the provision of an improved and effective fish lure which may incorporate my hook guard and which is formed in such manner as to reduce the possibilities of fouling or snagging the hooks on the bottom of a stream or lake when in use.

Other objects include the provision of a lure of the type described provided with a removable streamer, and which may be inexpensively produced from conventional materials.

With the foregoing objects outlined and with other objects in view as will appear more fully as the description proceeds, my invention resides in the novel features hereinafter described in detail and in the accompanying drawings, and more particularly pointed out in the appended claim.

In the accompanying drawings wherein several embodiments of my invention are shown:

Fig. 1 is a top plan view of one form of the improved fishing device, showing the hooks in folded inoperative position;

Fig. 2 is a longitudinal section of Fig. 1, in which the hooks are shown in dotted lines in extended operative position;

Fig. 3 is a top plan view of a modified form of the device;

Fig. 4 is a longitudinal section of Fig. 3;

Figs. 5 and 6 are views corresponding to Figs. 1 and 2, but showing a third form of the device;

Fig. 7 is a longitudinal sectional view showing a modified form of attaching means for the lure;

Fig. 8 is a perspective view of a further modification of the invention;

Fig. 9 is a detail sectional view of the device shown in Fig. 8; and

Fig. 10 is a view similar to Fig. 9, employing only two hooks instead of the three hook arrangement shown in Fig. 9.

Referring to Fig. 1, I provide a spoon 12 of suitable sheet material, such as copper, brass, or steel protected from corrosion as by plating which is generally concave and which tapers inwardly from the free or trailing end toward an aperture 36 to which a snap swivel 13 or the like may be secured. The opposite or trailing extremity of the spoon 12 is provided with another aperture 37 in which a ring 15 may be inserted. A twin gang hook 17, having shanks 16 secured to each other as by welding near the end opposite the hooks is provided with a suitable loop or attachment to the ring 15. The hook 17 is preferably made of resilient material, such as spring steel. As shown in full lines in Figs. 1 and 2, the curved portions of the hook 17 are so disposed as to position their points 18 in the concave surface of the trailing end portions of the spoon 12 when the hooks are folded on the ring 15 inwardly towards the aperture 36. When swung outwardly to the outward position as shown by the dotted lines in Fig. 2, the points 18 project upwardly facing in the same direction as the concave portion of the spoon 12. Since the spoon 12 is concave at or near its maximum width, it may be seen that the center of gravity of the spoon is such that hooks 17 will be held with the points 18 upwardly, thereby decreasing the tendency of the hooks to foul or snag when the lure is drawn along or near the bottom of a lake or stream.

The spoon 12 is provided with struck out portions 19 projecting upwardly and inwardly from the concave portion of the spoon forming tongues spaced apart a distance approximately equal to or somewhat less than the distance between the points 18. Since the gang hooks 17 are of resilient metal, it is possible to move the ends 18 of the points together a distance sufficient to enable them to be slipped under the tongues 19. When the pressure exerted by the fingers on the hooks 17 is released, the points 18 spring outwardly into engagement with the tongues 19 and are thereby retained firmly in inoperative position under the tongues. When so retained, it may be seen that the points of the hooks can not accidentally engage the fingers, the clothing, or other hooks, thus permitting several baits to be carried in a common container, such as a pocket.

In the modification of my invention illustrated in Figs 3 and 4, the spoon 12a is of substantially the same form as the spoon 12, but in place of utilizing a single double gang hook, this modification utilizes a pair of oppositely facing double gang hooks designated 16a and 16b, both secured to the spoon 12a by a suitable ring 15a. The hooks 16a and 16b are preferably, although not necessarily, of different lengths and are arranged in the position shown by dotted lines in Fig. 4 when in operation. When folded inwardly to inoperative position, the hooks 16a may be detachably engaged with tongues 19a struck outwardly from the concave surface of the spoon 12a, while hooks 16b, which are swung in reverse direction are retained under a second pair of spaced tongues 19b struck outwardly from the convex surface of the spoon 12a.

The form of invention shown in Figs. 5 and 6 includes a spoon 12c having a reverse curvature and providing spaced concave areas 20 and 21 at the opposite extremities of the spoon and facing in opposite directions. A length of wire 22 is attached at one end through an aperture 23 formed in the free or trailing end of the spoon 12c and extends longitudinally along the spoon, being crimped at the leading end to project through a plurality of longitudinally spaced apertures 24 in the leading end of the spoon. The crimped portions 24 of the wire 22 projecting through the apertures 24 form eyes to which a snap swivel 13 may be secured, thus holding the wire 27 in position along the spoon. The end of the wire 22 projecting through the aperture 23 is looped upon itself and extends through the shank 16c of the double gang hook, having points 18c facing upwardly in the same direction as the trailing concave portion 20 as shown in Figs. 6 and 7.

The points 18c of the hooks may be engaged, as previously described, with tongues 19c struck out from the concave section 20 of the spoon 12c. A streamer assembly 26 of colored feathers or hair is wound at one end with a length of wire which forms a loop 27 through which the wire 22 projects, the end portions of the wire projecting through a longitudinal slot 28 in spoon 12c. Ends 29 of the wire project laterally with respect to the slot on the side of the spoon 12c opposite the streamer 27 to lock the streamer in position.

If the lure is to be moved rapidly through the water or used in rapidly moving water, the swivel 13 is attached to the forward eye 25, since in this position movement of the lure is relatively less than will be obtained when the swivel 13 is attached to the eye 25 lying further towards the trailing end of the lure. Detaching the swivel 13 permits the wire 22 to be drawn upwardly from the the apertures 24, thus permitting removal of the streamer 26 by twisting the streamer until the ends 29 of the wire are in alignment with the slot 28.

Since the widest portion of the spoon 12c lies near the concave portion 20, it will be seen that the center of gravity is on the side of the spoon opposite the points 18c of the hooks 16c. This, plus the guiding effect of the streamer 26, makes it virtually impossible to draw the lure through the water in other than the position shown in Figs. 6 and 7 with the hooks pointed upwardly, regardless of how the lure happens to strike the water. This characteristic of my lure makes it possible to drag the lure on or near the bottom of the body of water where fish are more frequently found without the same degree of danger of snagging or fouling the hook as will be occasioned with more conventional lures. The spoon and streamer, however, wobble and move from side to side as the bait is drawn through the water in a manner tantalizing to fish and has the additional characteristic of maintaining in its movement through the water substantially the depth to which it is allowed to sink before being drawn in.

The form of my invention shown in Fig. 7 is substantially the same as that illustrated and described in Figs. 5 and 6, except that the loop 27d on the streamer 26d extends only around the wire 22, the slot 28 and the end portions 29 being eliminated, whereby the streamer may slide longitudinally along the wire 22.

The embodiment illustrated in Figs. 8-10 includes a plug body 30 of wood or the like provided with means 31 at one end for reception of a snap swivel 13 or a fishing line 14. The body 30 is provided with a series of recesses or pockets 38 of the form illustrated in Fig. 9 shaped to accommodate a three gang hook 16e. Hook eyes 32 are secured to the body 30 in any desired manner at the relatively shallow ends of the recesses 38, the other end of the recesses being of sufficient width and depth to receive the hooks 16e in the manner shown wherein the hooks are wholly disposed within the exterior surfaces of the body. A metal member 12e conforming in shape to each recess is introduced therein as shown in Fig. 9 and is permanently in a position as by the hook eyes 32. Resilient tongues 19e are formed in the member 12e to resiliently engage the hooks 16e as they are pressed downwardly into the recess, and to retain the hooks in this position until extracted.

The arrangement in Fig. 10 is substantially the same as that shown in Figs. 8 and 9, except that the gang hook 16f is a double hook instead of a treble hook. In this modification it is not essential that the entire hook portion lie within the external surfaces of the plug 30 and may, if desired, project upwardly a short distance beyond the plug body to facilitate extraction of the hooks. If desired, the member 12e and the corresponding recess 38 may be shaped to receive only one hook of treble gang hooks, the other two hooks lying near the surface of the body 30, but preferably within the plane on its exterior surface.

Conventional accessories such as strips of pork rind or rubber may be employed, if desired, as by attachment to the hooks. Better results will, however, be obtained by passing the crimped portions 25 of the wire 22 through the pork rind, thus allowing the strip to extend rearwardly along the spoon. The snap 13 may also be employed to attach the rind.

From the foregoing it is believed that the construction, operation and several advantages of my lure and hook guard will be readily understood and it is apparent various changes may be made in the details herein disclosed without departing from my invention defined in the appended claim.

I claim:

A fishing lure comprising a spoon of sheet material having line securing means at one end and hook securing means at the opposite end, a double gang hook pivotally secured on the latter means, said hook having resilient curved hook ends provided with barbs, said spoon having struck-out portions intermediate the ends of the spoon and on opposite sides of the longitudinal axis thereof, the opening in the struck-out portions facing each other and being a distance from the second means corresponding substantially to the distance from the barbed portion of the hook to the second means whereby the barbed portions may be sprung manually for insertion beneath the struck-out portions and may be sprung manually to release the same from the struck-out portions.

WILLIAM H. RICKARD.

REFERENCES CITED

The following references are of record in the file of this patent:

UNITED STATES PATENTS

| Number | Name | Date |
| --- | --- | --- |
| 378,678 | Harlow | Feb. 28, 1888 |
| 813,718 | Knowles | Feb. 27, 1906 |
| 1,232,804 | Jamison | July 10, 1917 |
| 2,124,822 | Johnson | July 26, 1938 |
| 2,163,378 | Horvath | June 20, 1939 |
| 2,215,908 | Lauby | Sept. 24, 1940 |
| 2,375,290 | Docteur | May 8, 1945 |
| 2,392,677 | Lauby | Jan. 8, 1946 |
| 2,476,485 | Erickson et al. | July 19, 1949 |
| 2,477,488 | Larson | July 26, 1949 |
| 2,503,369 | Wycech | Apr. 11, 1950 |